(No Model.)
M. F. GALE.
FOLDING JOINT FOR CHANDELIERS.
No. 406,094. Patented July 2, 1889.
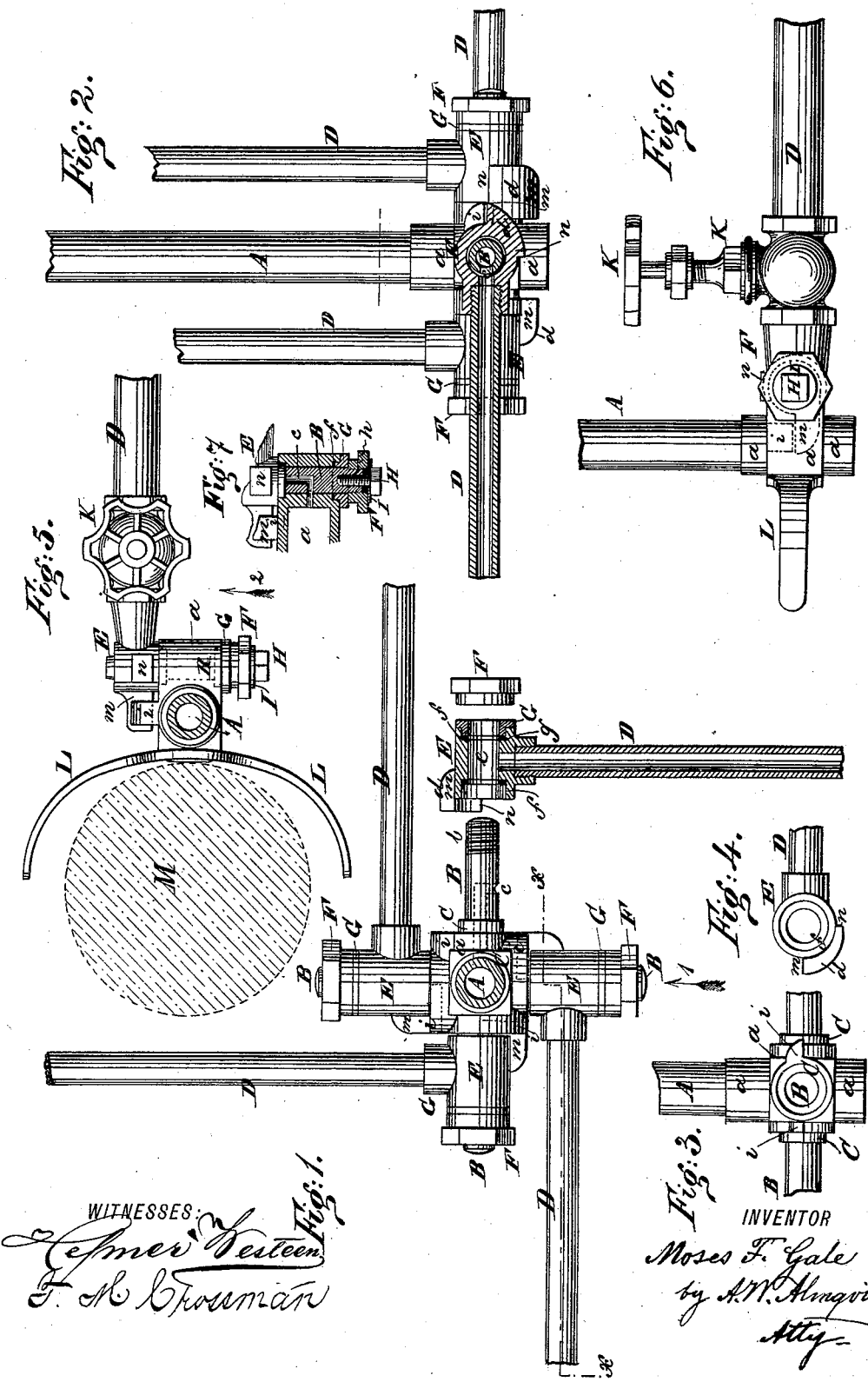
WITNESSES:
INVENTOR
Moses F. Gale
by A. W. Almqvist
Atty

United States Patent Office.

MOSES F. GALE, OF BROOKLYN, NEW YORK.

FOLDING JOINT FOR CHANDELIERS.

SPECIFICATION forming part of Letters Patent No. 406,094, dated July 2, 1889.

Application filed March 17, 1887. Serial No. 231,228. (No model.)

*To all whom it may concern:*

Be it known that I, MOSES F. GALE, a citizen of the United States, and a resident of Brooklyn, in the county of Kings and State of New York, have invented new and useful Improvements in Folding Joints for Chandeliers, of which the following is a specification.

My invention relates to pipe-joints for chandeliers in general, but more especially such as are used for illuminating shows and gatherings in the open air where a liquid—such as gasoline—is the illuminating substance employed.

The invention comprises an improved construction whereby the arm or arms or branch pipes carrying the burner or burners may be readily folded upon the main or supply pipe, so as to occupy a comparatively small compass for convenience in packing and transportation, and when folded or only partly folded will cut off the supply from the main pipe, and thus extinguish the flame, thereby preventing accident by fire; also whereby leaking of the joints and the waste, annoyance, and danger caused thereby will be prevented, and also whereby the arm or arms will be retained and supported in the proper position whether folded or unfolded.

The invention will be hereinafter fully described and specifically claimed, reference being had to the accompanying drawings, in which—

Figure 1 represents a top or plan view of a four-armed joint, the supply-pipe being shown in section, the arms or branch pipes unfolded in position for use, one of them being shown in section, removed from and placed in juxtaposition to the nipple upon which it turns. Fig. 2 is a side elevation of the same with two of the arms folded and one unfolded, shown in section through the line $x\,x$ of Fig. 1. Fig. 3 is a side view seen in direction of arrow 1 of Fig. 1, the arms or branch pipes being removed from the nipples. Fig. 4 is a detail view of the said arm or branch pipe as it appears when lifted off from the nipple in Fig. 3 and turned over from the left to the right. Fig. 5 is a plan view of a single-armed joint and its position relative to the suspension-pole, the main or supply pipe being shown in section and the arm unfolded. Fig. 6 is a side view of the same, seen in the direction of arrow 2, Fig. 5. Fig. 7 is a detail horizontal section of the joint shown in Fig. 5.

A is the main or supply pipe connecting the tank or holder with the arms or branch pipes. The pipe A is provided with transversely-projecting nipples B, which are secured to the pipe A either directly or by means of an enlargement or chamber $a$, in which case the nipples are preferably cast in one piece with the said chamber and the latter secured upon the lower end of the pipe A. Each nipple B is threaded at $b$ for the reception of a nut F, and is provided with an angular bore or channel $c$, whose inner end connects to the chamber $a$ and pipe A, and whose outer end issues at the side of the nipple B, as seen in Figs. 1 and 7. At the junction of the nipple B with the chamber $a$ is a shoulder C. Each arm or branch D is provided with a T joint or coupling E, the bore $e$ of which fits exactly upon the nipple B. At the ends the said bore is enlarged by rabbets $f$, one of which fits the shoulder C, and the other one is adapted to receive a loose collar G, (the shape of which is shown in Figs. 1 and 7,) and in the rabbets $f$, adjoining the said shoulder and collar, are interposed washers or packing $g$, so that when the T-joint E is put upon the nipple B and the nut F is tightened upon the threads $b$ against the collar G the washers $g$ will be compressed, so as to tighten against the nipple, shoulder, and collar at the same time, thus forming a tight joint.

The nut F and nipple B are provided with right-hand threads, and in order to prevent the possibility of unscrewing the nut F by turning down the arm D in unfolding it I make a socket $h$ in the outer end of the nipple B, and provide the same with left-hand threads and a correspondingly left-hand-threaded screw H, interposing between the outer surface of the nut F and the head of the said screw a metallic washer I, as shown in Figs. 5, 6, and 7. The nut F and the screw H being provided with oppositely-winded threads, it is evident that the screw H will lock the nut and prevent it from unscrewing.

To limit the movement of the arms D to and between the horizontal and vertical positions—that is, between that of being unfolded and in position for use and that of being folded, as for transportation, or when not in use—I provide about the supply-pipe A or the chamber $a$ projections $i$, serving as stops at the end of the throw, and upon the joint E, I provide a lug $d$, having abrupt ends $m\ n$, acting against the stationary stops $i$, to limit the throw of the arms and keep them in position at the limit of the throw. Of course the lug $d$ may be cut away so as to leave only the end surfaces $m\ n$, or the latter may be pins.

When the chandelier has four arms, the stop $m$ (see Figs. 3 and 4) rests against the stop $i$ at the right in Fig. 3, and when folded or in the vertical position the stop $n$ rests against the surface of the next stop $i$ at the left in Fig. 3, being the same stop which holds the adjacent arm D to the left in its horizontal position when unfolded. Thus in the case of four arms the horizontal stop of each arm serves as the vertical stop for the next one.

When only one arm is used, as in Fig. 5, the horizontal stop $m$ strikes the lower surface of the stop $i$, and the stop $n$ strikes the vertical side of the said stop $i$.

K is the valve for admitting or cutting off the supply to and from the burner. When only one arm D is used, as in Fig. 5, I provide the pipe A with a guard L, which, by resting against the surface of the pole M, to which the chandelier is suspended, prevents it from getting out of the proper vertical position to insure a horizontal position of the arm D.

It will be noticed that, whether the supply-valve K is open or closed, the communication between the channel $c$ of the nipple B and that of the arm D is cut off just as soon as the arm has been turned on the nipple far enough to bring the bore in the tube or arm D past the end opening in the channel $c$. This has also the advantage that if, as has happened, the chandelier with the gasoline-tank attached falls from its point of suspension, breaking the tank and spilling its contents upon the floor or ground, the turning of the arm D, caused by its striking the ground or an obstacle in the fall, instantly cuts off the supply and puts out the flame, preventing it from spreading to the spilled contents of the tank.

When the arm or arms are folded up against the supply-pipe, the chandelier occupies a comparatively very small compass, and is convenient for transportation and packing.

Having thus described my invention, what I claim as new, and desire to secure by Letters Patent, is—

1. In a chandelier, the combination, with a stationary supply-pipe, of a burner branch or arm hinged or pivoted to the said supply-pipe so as to fold upon the same and cut off the supply to the burners and to unfold into position for use and admit supply to the burners, provided with stop-valve K, substantially as and for the purpose set forth.

2. In a chandelier, the combination of the supply-pipe A, having nipple B, with side opening communicating by a channel $c$ with the said supply-pipe, with a burner-arm D, provided with end piece E, having bore $e$, fitting the said nipple and placing the said channel $c$ in communication with the bore in the said arm D when unfolded, substantially as specified.

3. In a chandelier, the combination of the supply-pipe A, having threaded nipple B, with shoulder C, and side opening communicating by a channel $c$ with the said supply-pipe, and with an arm D, provided with an end piece E, having bore $e$, with end rabbets $f$ and packing $g$, the ring G, and nut F to make a movable and tight-fitting joint between the said supply-pipe and its arm.

4. In a chandelier, the combination of the supply-pipe A, having threaded nipple B, with shoulder C, and side opening communicating by a channel $c$ with the said supply-pipe, with an arm D, provided with an end piece E, having bore $e$, with end rabbets $f$ and packing $g$, the ring G and nut F, and the screw H, threaded in an end socket in the nipple B with threads wound reversely to those of the nut F and nipple B and bearing with its head directly upon the end surface of the said nut.

5. In a chandelier, the combination of the supply-pipe A, having stops $i$, nipple B, with side opening communicating by a channel $c$ with the said supply-pipe, with an arm D, provided with lugs $m\ n$, and an end piece E, having bore $e$ fitting the said nipple and placing the said channel $c$ in communication with the bore in the said arm D when unfolded, substantially as specified.

6. In a chandelier, the combination of the supply-pipe A, having chamber $a$, and four nipples B, having channels $c$, as described, with the four arms D, having T-joints E and pivoted one upon each of the said nipples, the said chamber $a$ being provided with stationary stops $i$ and each of the said arms being provided with two stops $m\ n$, substantially as specified.

7. In a chandelier, the combination of the supply-pipe A, having stops $i$, nipple B, with shoulder C, and side opening communicating by a channel $c$ with the said supply-pipe, with an arm D, provided with an end piece E, having lugs $m\ n$, bore $e$, with end rabbets $f$ and packing $g$, the collar G, and means for pressing the said collar inward upon the said nipple to make a movable and tight-fitting joint between the said supply-pipe and arm, substantially as specified.

In testimony that I claim the foregoing as my invention I have signed my name, in presence of two witnesses, this 14th day of March, 1887.

MOSES F. GALE.

Witnesses:
A. W. ALMQVIST,
A. WAHLBERG.